United States Patent
Calfee

(10) Patent No.: US 8,459,682 B2
(45) Date of Patent: Jun. 11, 2013

(54) SEAT POST RECEPTACLE FOR POWER AND CIRCUITRY ELEMENTS

(75) Inventor: Craig Calfee, Watsonville, CA (US)

(73) Assignee: Calfee Design, La Selva Beach, CA (US)

( * ) Notice: Subject to any disclaimer, the term of this patent is extended or adjusted under 35 U.S.C. 154(b) by 64 days.

(21) Appl. No.: 13/155,316

(22) Filed: Jun. 7, 2011

(65) Prior Publication Data

US 2012/0313407 A1 Dec. 13, 2012

(51) Int. Cl.
*B62J 11/00* (2006.01)
*B62K 19/40* (2006.01)

(52) U.S. Cl.
USPC ..... 280/288.4; 224/427; 224/902; 280/281.1; 429/164

(58) Field of Classification Search
USPC ............. 280/288.4, 281.1, 274; 224/902, 224/425, 427; 429/164, 186, 163, 175–177; 362/157, 473
See application file for complete search history.

(56) References Cited

U.S. PATENT DOCUMENTS

| | | | | |
|---|---|---|---|---|
| 427,789 | A * | 5/1890 | Nevins | 429/186 |
| 1,271,692 | A * | 7/1918 | Ford | 429/186 |
| 1,313,384 | A * | 8/1919 | Hutchison | 429/149 |
| 4,814,951 | A * | 3/1989 | Larsen | 362/473 |
| 4,833,777 | A | 5/1989 | Clark | |
| 5,618,052 | A * | 4/1997 | Rendall | 280/288.4 |
| 5,842,714 | A | 12/1998 | Spector | |
| 6,158,881 | A | 12/2000 | Carne | |
| 7,886,947 | B2 | 2/2011 | Campagnolo | |
| 2008/0179858 | A1 * | 7/2008 | Chen | 280/281.1 |

* cited by examiner

*Primary Examiner* — Anne Marie M Boehler
(74) *Attorney, Agent, or Firm* — Jonathan A. Small

(57) ABSTRACT

A cycle seat post having an axial hollow region has formed therein or attached thereto a retaining structure for removably securing a power cell cartridge within the hollow region. The retaining structure comprises one or more shoulders for engaging corresponding shoulders on the power cell cartridge. A retaining cap in physical engagement with the power cell cartridge secures the power cell cartridge in place. An opening in the retaining cap permits connection between a power cell retained in the power cell cartridge and electronic and/or electromechanical devices external to the power cell cartridge. A biasing member and spring claim may further secure retaining cap in place.

12 Claims, 7 Drawing Sheets

SEAT POST RECEPTACLE FOR POWER AND CIRCUITRY ELEMENTS

BACKGROUND

The present disclosure is related to providing power and electronic functionality to a wheeled cycle, such as a bicycle, and more specifically to methods and apparatus for retaining in a seat post of such a cycle power cells, circuitry, and related elements.

For many years there has been a trend toward the miniaturization of mechanical and electrical elements. In parallel, there has also been a trend toward bringing under electronic system control that which previously was manually controlled. For example, in field of cycle design, these trends are currently being realized in the introduction of electronically controlled gear shifting. The motors, gears, and many other operational elements can be produced of a size and weight such that they may essentially replace existing gear shifting devices (often referred to as derailleurs) without a significant change from the traditional location, function, weight, and so forth of traditional, manual mechanical elements.

However, the motors and other elements of these electronic gear-shifting systems require power. This power still must come from traditional batteries. Thus, there is a need to find a convenient location to house those batteries on the cycle, such that they do not significantly change the layout, balance, aerodynamics, and so forth of the cycle. Furthermore, due to the cost of batteries, environmental concerns, and so on, it is common to utilize rechargeable batteries in such systems. Thus, there is a need to access a connection fitting to the rechargeable batteries, or a mechanism for their removal and placement in a charging cradle, so that they may be connected to a charge source.

Similarly, the use of a motor and gears for gear shifting on a cycle requires a control mechanism. The control mechanism typically includes electronic components such as an integrated circuit and discrete electronic elements mounted to a printed circuit board. While it is possible to make the control mechanism quite compact and lightweight, in many embodiments the control mechanism is still separate from the gear shifting actuators located at the gear rings (e.g., at the rear hub and crank assembly) of the cycle. Accordingly, in certain embodiments it is required to devise a convenient, protected location to which the control mechanism may be secured.

In one known design, as disclosed in U.S. Pat. No. 7,886, 947, the batteries and control mechanism are housed in a water bottle cage of the type mounted to bosses secured to a tube of the cycle. Power for other uses, such as lighting, have been disposed in various tubes of a cycle, such as disclosed in U.S. Pat. Nos. 5,842,714, 4,833,777. Furthermore, power in the form of batteries for such other uses have also been disposed in components removably attached to a cycle, such as light sources with associated batteries contained in a seat post as disclosed in U.S. Pat. No. 6,158,881.

However, existing designs for retaining power cells to or in a cycle have one or more disadvantages. In some designs, the power cells are relatively permanently mounted into the cycle structure. In other designs, multiple clips, threaded caps, or other mechanisms must be manipulated in order to extract the power cells in known designs. Still further, in some designs, tubes and other structures not traditionally part of a cycle outfitting are required to carry power cells, control circuitry, and so forth.

SUMMARY

Accordingly, the present disclosure is directed to systems and methods for providing improved methods and apparatus for retaining in a seat post of a cycle power cells, circuitry, and related elements.

According to one aspect of the disclosure, a retaining structure for mounting inside a seat post and defining an opening for removably receiving and retaining a power cell, comprises a generally cylindrical body of a dimension and size for insertion into an axial hollow region defined in the seat post, the body having defined in a radially inside surface and at a distal end thereof a shoulder to form a stop for a power cell cartridge that may be inserted within the cylindrical body, the body further having defined in a radially outside surface and at a proximal end thereof a shoulder to stop insertion of a retaining cap into the body, the body further having defined therein a retaining member receiving feature in a radially inside surface and at a proximal end thereof to removably receive a retaining member for retaining the retaining cap against the body.

According to another aspect of the disclosure, a system for retaining a power cell cartridge within an axial hollow opening of a seat post, comprises a seat post having a proximal end and an axial hollow region extending through the proximal end and at least partway along the axial length of the seat post; the aforementioned retaining structure; a generally cylindrical power cell cartridge having a first region with diameter sized for removable insertion from the proximal end of the body into the hollow opening of the body, the power cell cartridge defining a hollow opening therein, the cartridge having defined in a radially outside surface and at a proximal end thereof a shoulder to form a stop for engaging the stop defined in the body; and a cap structure securable within the hollow opening of the cartridge at a proximal end thereof, the cap structure having a longitudinal opening therein through which lead wires from a power cell disposed within the hollow opening of the cartridge may extend.

In certain embodiments, the system described above may further comprise a retaining member receiving feature defined in a radially inside surface of the generally cylindrical body to removably receive a retaining member. The retaining member receiving feature may comprise a circumferential groove formed in the inside surface of the body. The system may still further comprise a removable biasing member disposed within the circumferential groove in the body to thereby removably secure the cap structure to the cartridge, and the cartridge within the hollow region within the seat post.

In still other embodiments, the aforementioned retaining structure forms a portion of the seat post. Other aspects described above may be provided, but without the need for a separate retaining structure that is secured to the seat post.

The above is a summary of a number of the unique aspects, features, and advantages of the present disclosure. However, this summary is not exhaustive. Thus, these and other aspects, features, and advantages of the present disclosure will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION

We initially point out that descriptions of well known starting materials, processing techniques, components, equipment and other well known details are merely summarized or are omitted so as not to unnecessarily obscure the details of the present invention. Thus, where details are otherwise well known, we leave it to the application of the present invention to suggest or dictate choices relating to those details.

Figure 1:
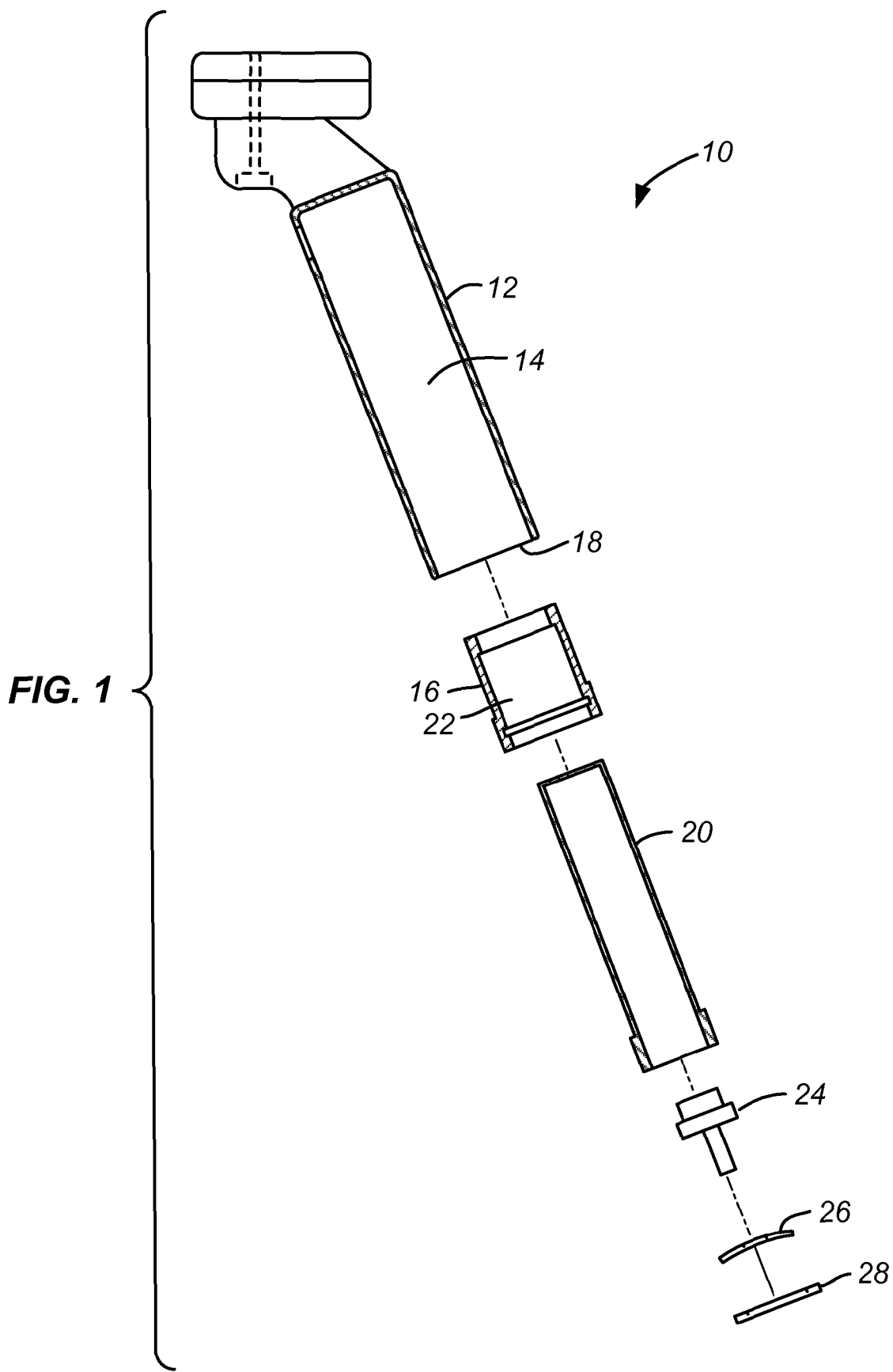
FIG. 1 is a cross-section, assembly view of a seat post with receptacle for a power and circuitry according to an embodiment of the present disclosure.

With reference first to FIG. 1, there is shown therein an exploded view of a seat post assembly 10 including a power cell cartridge and retaining sleeve according to an embodiment of the present disclosure. Assembly 10 includes a seat post 12, of a type well know to one skilled in the art. Seat post 12 has a hollow interior region 14, typically formed to reduce the amount of material used in the seat post, and hence reduce its weight and cost. Assembly 10 further includes a retaining sleeve 16 that is sized and configured to be secured into an opening 18 at one end of seat post 12. A power cell cartridge 20 is sized and configured to be removably secured in an axial opening 22 in retaining sleeve 16. A retaining cap 24 is sized and configured so as to seat against the power cell cartridge 20, and in one embodiment, to fit partly within axial opening 22. A biasing member 26 may be positioned against a surface of the retaining cap 24, held in place by a snap ring 28 or similar retaining sleeve. Various of these elements and their relationship to one another are discussed further below.

Figure 2:
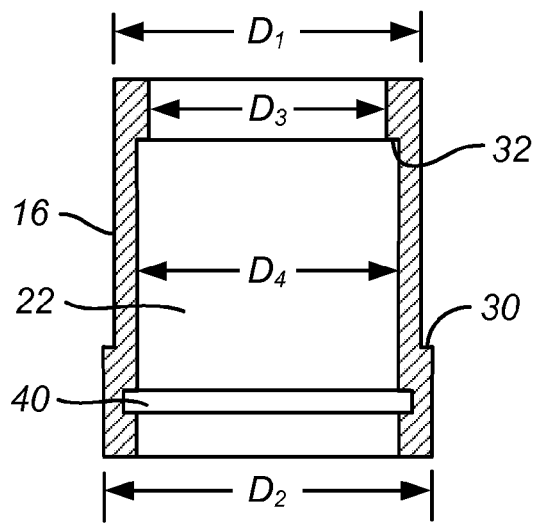
FIG. 2 is a cross-section view of a retainer sleeve according to an embodiment of the present disclosure.

With reference to FIG. 2, a magnified, cross-section view of retaining sleeve 16 is shown. Retaining sleeve 16 is a generally cylindrical body with a number of features formed therein. These features facilitate positioning and retention of retaining sleeve 16 within the opening 18 in seat post 12 (FIG. 1), as well as positioning and retention of power cell cartridge 20 within both opening 18 in seat post 12 and opening 22 in retaining sleeve 16. For example, retaining sleeve 16 has a first circular cross-section with exterior diameter $D_1$ and a second circular cross-section with exterior diameter $D_2$, such that $D_1 < D_2$. The transition from exterior diameter $D_1$ to exterior diameter $D_2$ is relatively abrupt so as to define a shoulder 30 on the exterior surface of retaining sleeve 16. Exterior diameter $D_1$ is sized so as to relatively snugly fit within hollow interior region 14 up to shoulder 30. In use, an adhesive or other semi-permanent or permanent connection mechanism may bond the exterior surface of retaining sleeve 16 having exterior diameter $D_1$ to the interior surface of seat post 12 within hollow interior region 14. Alternatively, the various relative dimensions may be such that a press-fit between the exterior surface of retaining sleeve 16 having exterior diameter $D_1$ and the interior surface of seat post 12 will be sufficient to secure retaining sleeve 16 in place therein.

Figure 3:
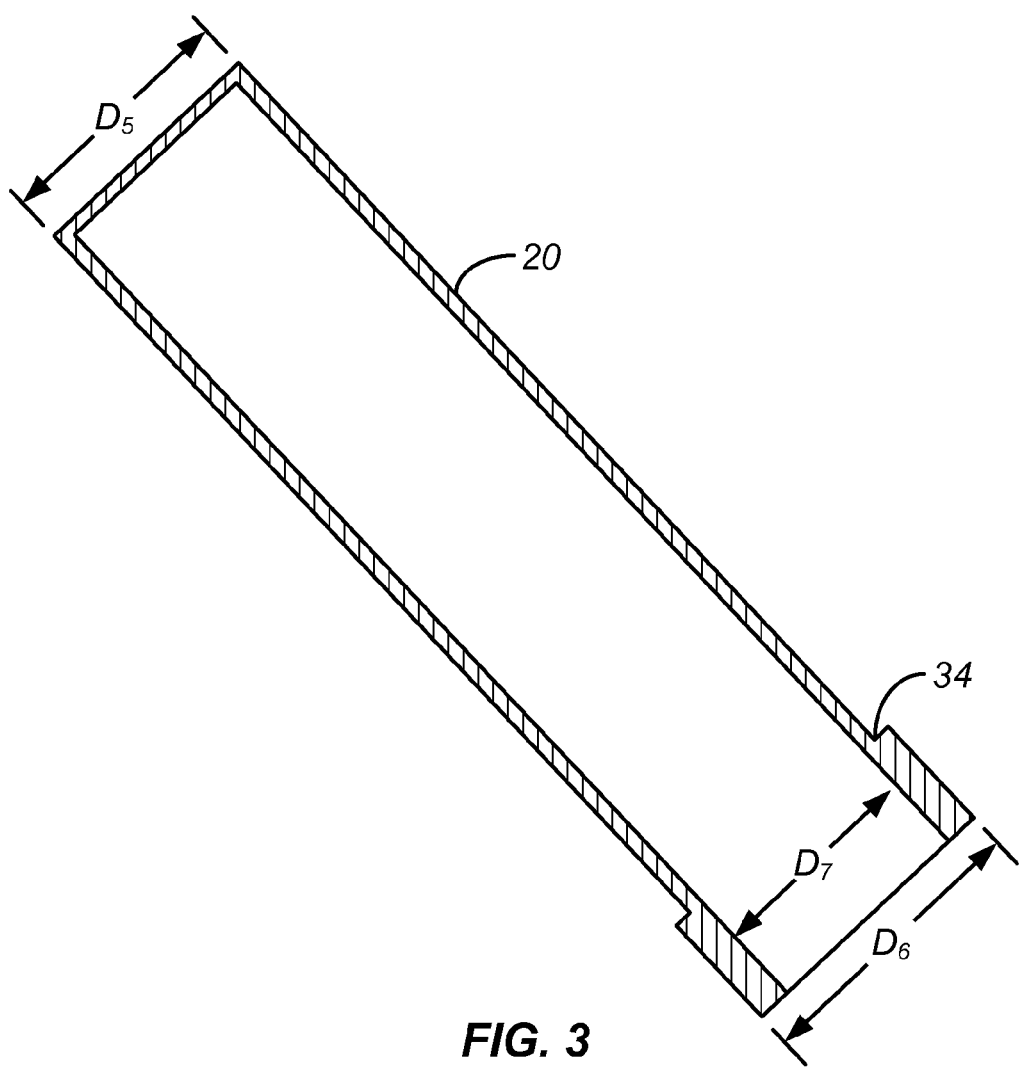
FIG. 3 is a cross-section view of a power cell cartridge according to an embodiment of the present disclosure.

Retaining sleeve 16 is also formed to have a first inner diameter $D_3$, and a second inner diameter $D_4$, with a relatively abrupt transition therebetween, and with $D_3 < D_4$, so as to define a shoulder 32 to assist in the positioning and retention of a power cell cartridge within opening 22. With reference to FIG. 3, a cross-section of a power cell cartridge 20 is shown. Power cell cartridge 20 is formed to have a first outside diameter $D_5$ slightly smaller that $D_3$, so that power cell cartridge 20 fits relatively snugly but removably within opening 22 of retaining sleeve 16. Power cell cartridge 20 is formed to have a second outside diameter $D_6$ larger than $D_3$, but slightly smaller than $D_4$, with a relatively abrupt transition between the first and second outside diameters to thereby form a shoulder 34. Accordingly, power cell cartridge 20 may be disposed within opening 22 such that the first portion having outside diameter $D_5$ passes all the way through region 22 of retaining sleeve 16, and the second portion having outside diameter $D_6$ is retained within region 22 of retaining sleeve 16 and prevented from passing therethrough by the physical interaction of shoulders 32, 34. This is illustrated in the expanded view of FIG. 5.

Figure 4:
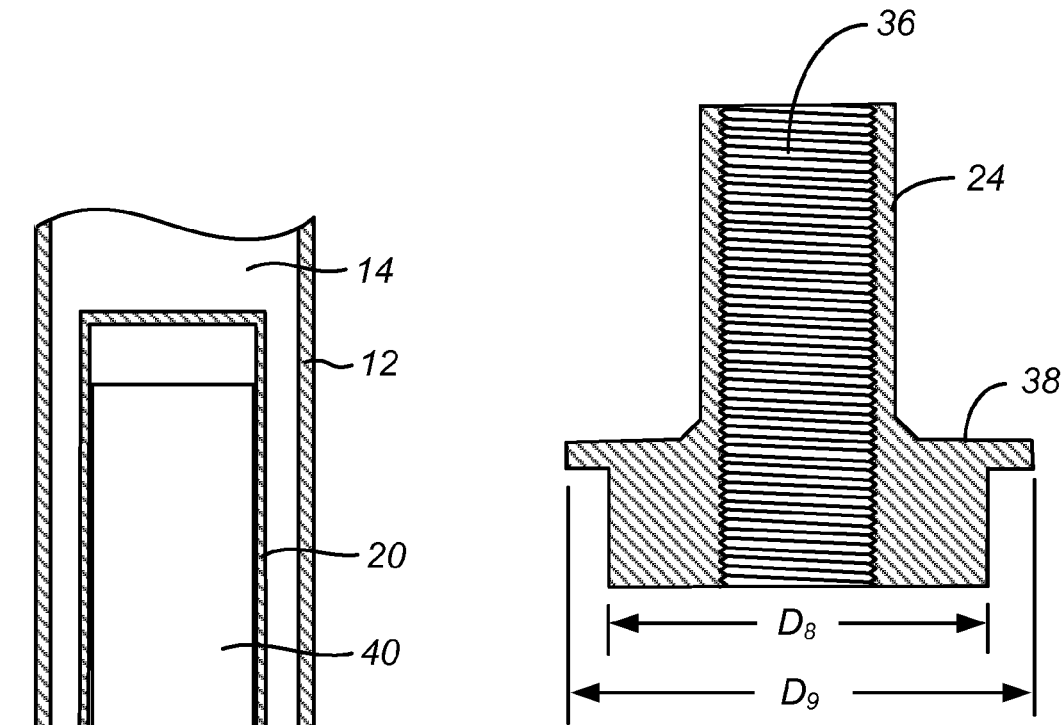
FIG. 4 is a cross-section view of a retaining cap according to an embodiment of the present disclosure.
Figure 5A:
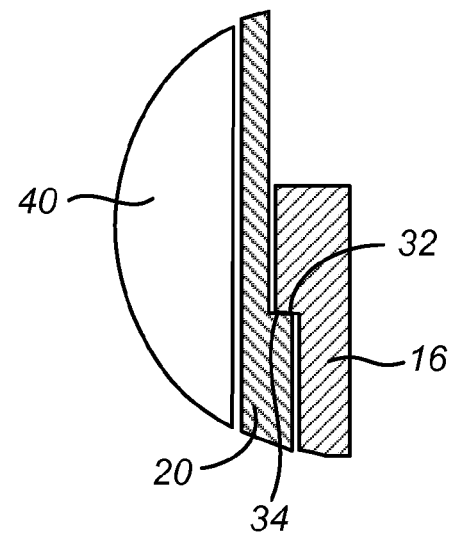

While a plurality of methods and arrangements may be employed to secure power cell cartridge 20 within retaining sleeve 16, in one embodiment a retaining cap 24 such as shown in FIG. 4, is used. Retaining cap 24 comprised a cylindrical body having a first region with an outside diameter $D_8$ that is slightly less than the inside diameter $D_7$ of power cell cartridge 20, and a second region with an outside diameter $D_9$ such that $D_6 < D_9 < D_4$. Accordingly, retaining cap 24 fits snugly against the end face of power cell cartridge 20, with a portion thereof inside power cell cartridge 20, and a portion thereof inside retaining sleeve 16. This is also illustrated in the expanded view of FIG. 5.

Retaining cap 24 is also formed to have an axial opening 36 therein, through which electrical interconnections, which may terminate in an electrical connector, may extend. Axial opening 36 me have a smooth inner wall surface, or may be threaded to receive an electrical connector of a type otherwise known in the art.

Figure 5:
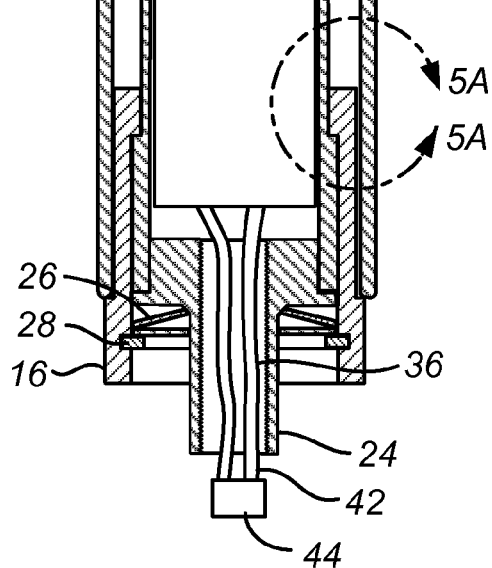
FIG. 5 is a cross-section view of an assembly including a seat post retaining sleeve, power cell cartridge, and retaining cap, with a power cell disposed therein, according to an embodiment of the present disclosure.

With reference to FIG. 5, a biasing member 26 may be installed against a biasing surface 38 of retaining cap 24 to bias retaining cap 24 into physical contact with power cell cartridge 20 and thereby retain same in place within retaining sleeve 16 and seat post 12. Finally, a circular spring clip 28 or similar element designed to engage a track 40 in retaining sleeve 16 (FIG. 2) may be employed to retain biasing member 26 in place. Once again, an assembly including each of the aforementioned elements assembled as described is illustrated in FIG. 5. Also shown in FIG. 5 is a power cell 40 secured within power cell cartridge 20, and electrical connections 42, which terminate in an electrical connector 44, extending through and out of axial opening 36.

While described in terms of a power connection, connector 44 may also facilitate a data connection. For example, connector 44 could be a universal serial bus (USB) format connector, providing power, and possibly data services such as storage, data processing, connection to a wireless (e.g., Bluetooth) or similar communications circuit, and so on. Such a data connection would permit access to and display of (for example via a bar mounted display, not shown) gear tables, trip data, and other such data.

While retaining cap 24, biasing member 26 and spring clip 28 form a relatively convenient and simple method of retaining power cell cartridge 20 in place within retaining sleeve 16 and seat post 12, many other arrangements and methods may be employed to removably retain power cell cartridge 20 therein. Single clips, level clips, elastic O-rings, and other such arrangements may perform an equivalent function. Importantly, however, any such arrangement should be simple to operate (for quick removal of power cell cartridge 20), not extend beyond the outside diameter of seat post 12, be relatively lightweight, and permit electrical connections from power cell cartridge 20 to extend therefrom for connection to electronic and/or electromechanical devices and controls therefor.

Figure 6:
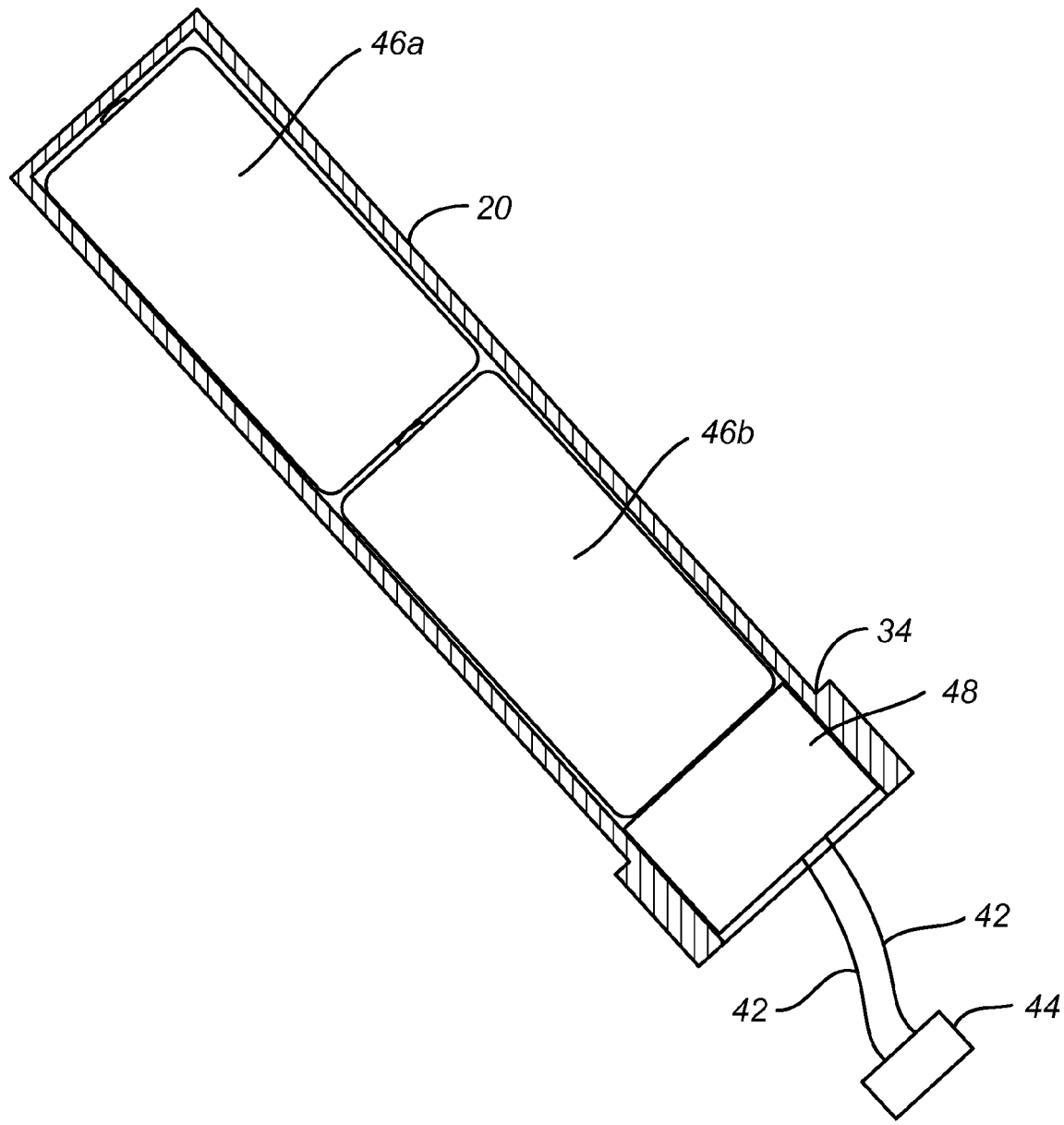
FIG. 6 is a cross-section view of a power cell cartridge according to another embodiment of the present disclosure.

It will be appreciated that power cell 40 may be removably disposed in power cell cartridge 20. Alternatively, individual power cells 46a, 46b (e.g., batteries) may also be disposed therein, as illustrated in FIG. 6. As a further alternative, power cell cartridge 20 may itself form the housing for the power cell, and therefore the cartridge and power cell would not readily be separable from one another (although the combination would be separable from a seat post and retaining sleeve in which they may be mounted). Still further, power cell cartridge 20 may contain, or have appended thereto, a circuitry package 48, which operates in conjunction with the power cell and user controls (not shown) to effect, for example, actuation of an electromechanical device (e.g., a gear shift mechanism), an electronic device (e.g., a music player), and so on.

In one embodiment, the assembly illustrated in FIG. 5 may be attached to connectors (not shown) that electrically interconnect the power cell to an electromechanical device (e.g., a gear shift mechanism), an electronic device (e.g., a music player), and so on. This connection will typically also include user controls and controller circuitry. The electrical connectors to which connector 44 may attach may run within tubing of the cycle such that when seat post 12 is fitted into a seat tube of the cycle, all wires reside substantially within the tubes of the cycle, emerging only to connect to the user controls, controller circuitry, electromechanical device, and/or an electronic device. When the charge in the power cell is depleted, the seat post may be removed from the seat tube, the connection to the circuitry temporarily disconnected, and the power cell connected to a charging source.

Figure 7:
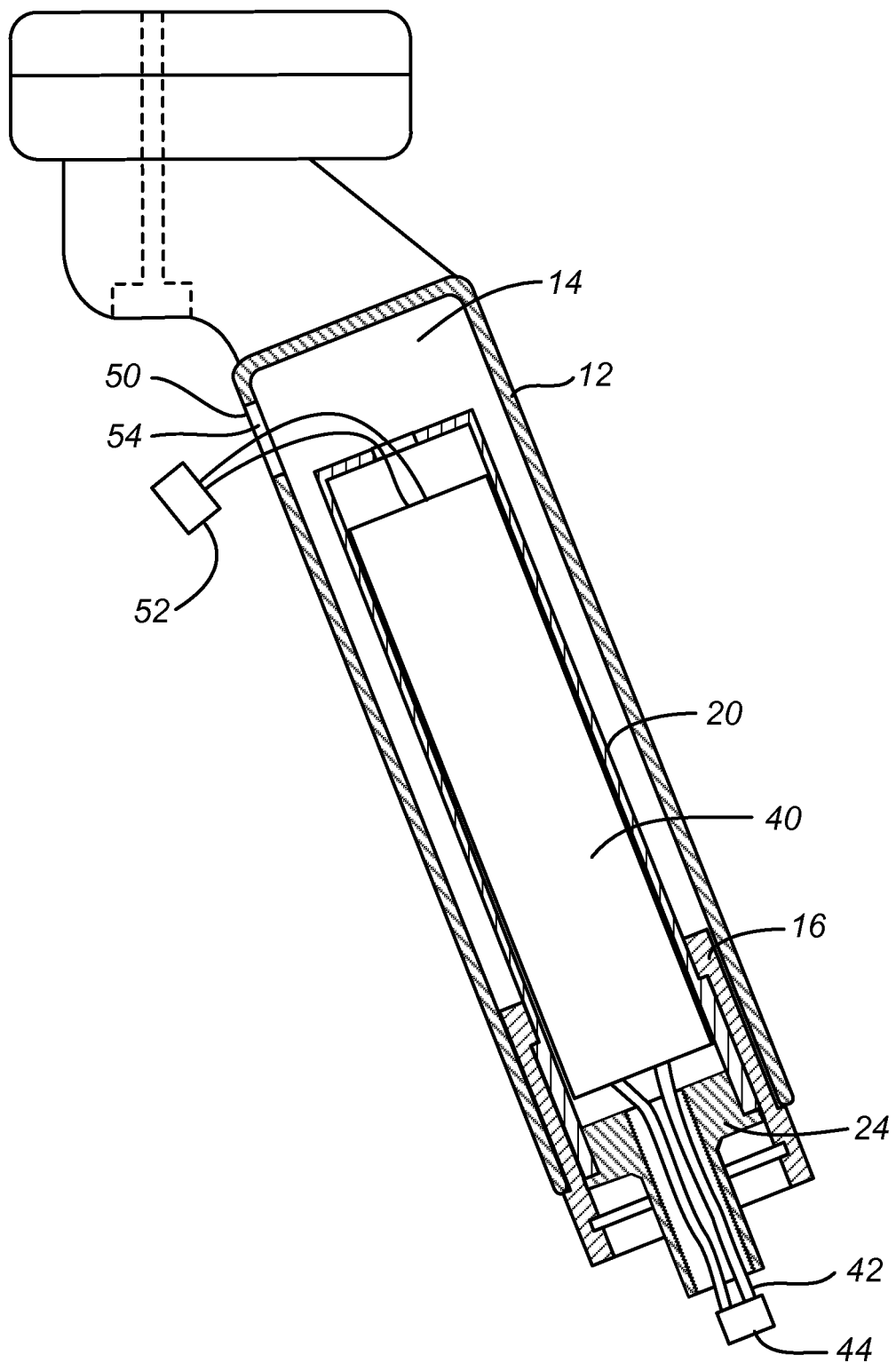
FIG. 7 is cross-section view of an assembly including a seat post retaining sleeve, power cell cartridge, and retaining cap, with a power cell disposed therein, and further including a connector disposed for connection without removal of the seat post, according to an embodiment of the present disclosure.

As an alternative to the aforementioned method of operation, and as illustrated in FIG. 7, seat post 12 may be provided with an opening 50, and a connector 52 may extend through opening 50. In one embodiment, connector 52 is a charging connector. Rather than removing seat post 12 in order to charge power cell 40, a user may simply connect a charging device to connector 52. In another embodiment, connector 52 could be a USB connector, providing power, and possibly data services such as storage, data processing, connection to a wireless (e.g., Bluetooth) or similar communications circuit, and so on. A waterproof seal 54 would be provided in such a case in order to minimize intrusion of water into interior region 14 of seat post 12 which could thereby damage power cell 40, electrical interconnections, control circuitry etc. disposed therein. In this embodiment, power cell 40 could be removably disposed within seat post 12 in order to permit replacement of the power cell should it ever fail.

Figure 8:
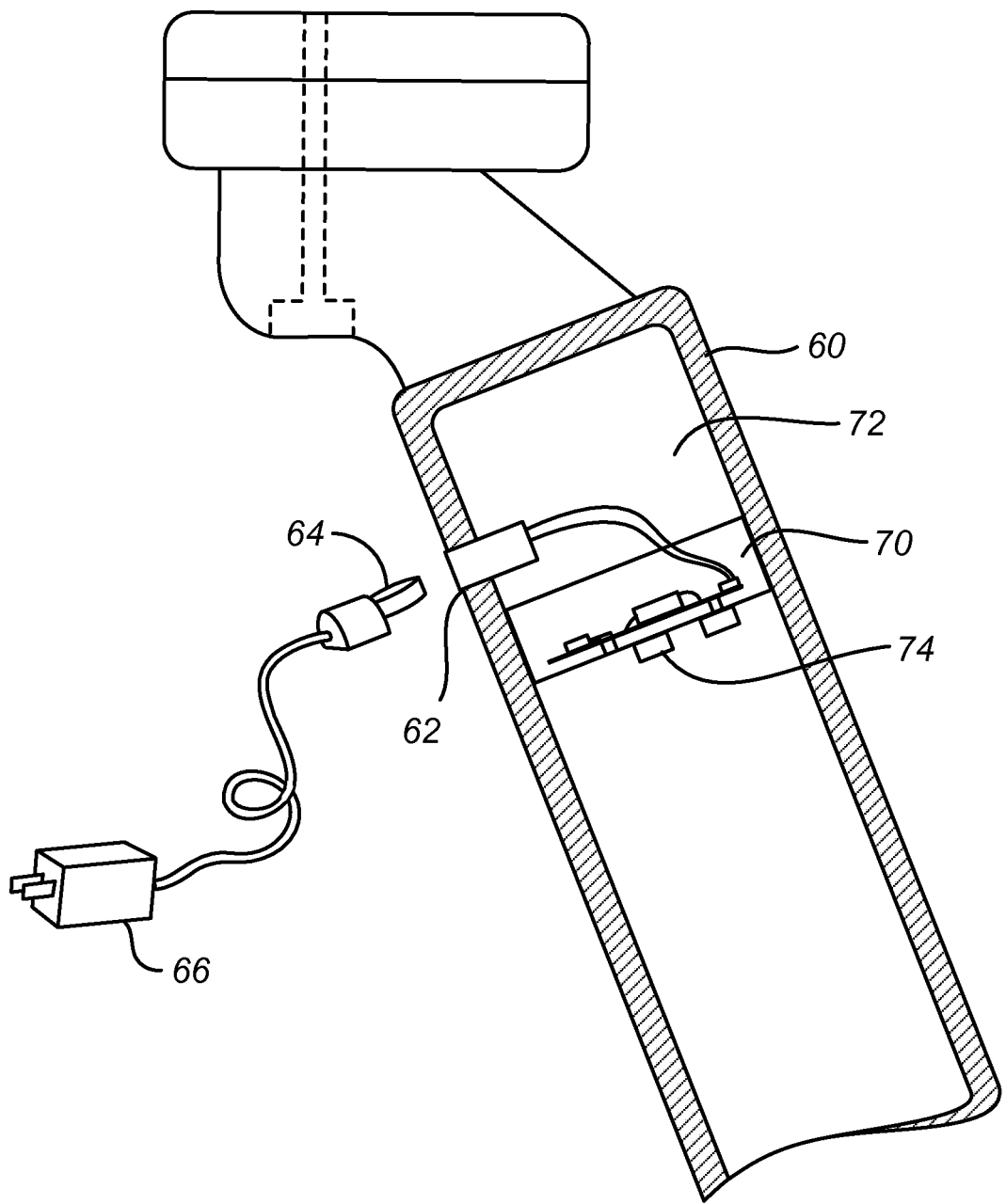
FIG. 8 is a cross-section of a seat post for a cycle having a socket formed therein for receiving a connector for charging, data transfer, and so forth, according to an embodiment of the present disclosure.

In a variation of the above-described embodiment, and as illustrated in FIG. 8, in place of a wire and connector arrangement, a more permanent external connector 62 may be formed or disposed in a seat post 60. An appropriate fitting 64 on a charging device 68 (or alternatively a data transfer device, and so) on may then be connected to connector 62, permitting charging of power cells, transfer of data, software updating, and so on. In such a case, control circuitry 70 may be more permanently secured within the axial opening 72 defined in seat post 60, and one or more internal connector contacts 74 also be disposed therein to permit the removable electrical interconnection of the power cell cartridge to the socket.

Figure 9:
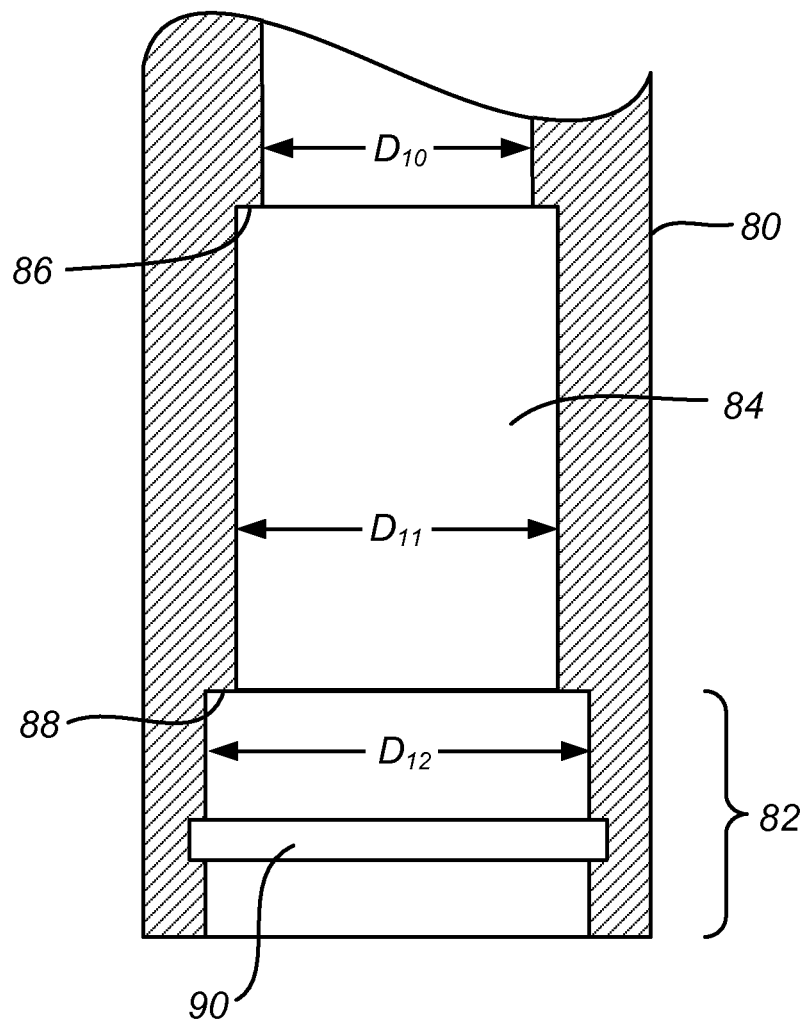
FIG. 9 is a cross-section of a seat post for a cycle having a retaining region formed therein according to an embodiment of the present disclosure.

To this point, the present disclosure has been in terms of a retaining sleeve positioned within an opening in a seat post of a cycle. One advantage of such an arrangement is than an off-the-shelf seat post can be employed with little or no machining required to provide a power cell retaining arrangement. However, in another embodiment, shown in FIG. 9, a seat post 80 is formed or modified to have a retaining region 82 therein, similar to the configuration described above.

Seat post 80 is formed to include a number of features. These features facilitate positioning and retention of a power cell cartridge (such as power cell cartridge 20, FIG. 3) within opening 84 in seat post 80. For example, region 84 is formed to have a first circular cross-section with interior diameter $D_{10}$ and a second circular cross-section with interior diameter $D_{11}$, such that $D_{10}<D_{11}$. The transition from interior diameter $D_{10}$ to interior diameter $D_{11}$ is relatively abrupt so as to define a shoulder 86 on the interior surface of seat post 80. Shoulder 86 serves as a stop for a power cell cartridge having a correspondingly shaped and positioned stop, as previously described.

In addition, retaining region 82 is formed to have a third circular cross-section with interior diameter $D_{12}$, such that $D_{11}<D_{12}$. The transition from interior diameter $D_{11}$ to interior diameter $D_{12}$ is relatively abrupt so as to define a shoulder 88 on the interior surface of seat post 80. An annular recess 90 is also defined in seat post 80 for receiving a circular spring clip or similar retaining mechanism. A power cell cartridge 20 may then be disposed directly within region 84, and retained by a retaining cap 24, biasing member 26, and spring clip 28 as previously described, obviating the need for a retaining sleeve.

The embodiments described above seek to define the disclosure in terms of example. However, may other examples may follow from those disclosed herein. Accordingly, no limitation in the embodiments described above or the claims appended hereto can or should be read as absolute. The limitations of the claims are intended to define the boundaries of the present disclosure, up to and including those limitations. To further highlight this, the term "substantially" may occasionally be used herein in association with a description and/or claim limitation. While as difficult to precisely define as the limitations of the present disclosure themselves, we intend that this term be interpreted as "to a large extent", "as nearly as practicable", "within technical limitations", and the like.

Furthermore, while a plurality of preferred exemplary embodiments have been presented in the foregoing detailed description, it should be understood that a vast number of variations exist, and these preferred exemplary embodiments are merely representative examples, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

What is claimed is:

1. A cartridge retention structure for removably securing a power cell cartridge within an axial hollow region of a seat post, comprising:
   a generally cylindrical body of a dimension and size for securable insertion into said axial hollow region in said seat post, said body defining a hollow opening therein, said body having defined in a radially inside surface and at a distal end thereof a shoulder to form a stop for a power cell cartridge that may be inserted within said cylindrical body;
   a generally cylindrical power cell cartridge having a first region with diameter sized for removable insertion from said proximal end of said body into said hollow opening of said body, said power cell cartridge defining a hollow opening therein, said cartridge having defined in a radially outside surface and at a proximal end thereof a shoulder to form a stop for engaging said stop defined in said body; and
   a cap structure securable within said hollow opening of said power cell cartridge at a proximal end thereof, said cap structure having a longitudinal opening therein through which lead wires from a power cell disposed within said hollow opening of said cartridge may extend.

2. The cartridge retention structure of claim 1, further comprising a retaining member receiving feature defined in a radially inside surface of said generally cylindrical body to removably receive a retaining member.

3. The cartridge retention structure of claim 2, wherein said retaining member receiving feature comprises a circumferential groove formed in said inside surface of said body.

4. A system for retaining a power cell cartridge within an axial hollow opening of a seat post, comprising:
   a seat post having a proximal end and an axial hollow region extending through said proximal end and at least partway along the axial length of said seat post;
   a generally cylindrical body secured within said axial hollow region, and at said proximal end, of said seat post, said body defining a hollow opening therein, said body having defined in a radially inside surface and at a distal end thereof a shoulder to form a stop for a power cell cartridge that may be inserted within said cylindrical body, said body further having defined in a radially outside surface and at a proximal end thereof a shoulder to stop insertion of said cylindrical body into said seat post;
   a generally cylindrical power cell cartridge having a first region with diameter sized for removable insertion from said proximal end of said body into said hollow opening of said body, said power cell cartridge defining a hollow opening therein, said cartridge having defined in a radially outside surface and at a proximal end thereof a shoulder to form a stop for engaging said stop defined in said body; and
   a cap structure securable within said hollow opening of said cartridge at a proximal end thereof, said cap structure having a longitudinal opening therein through which lead wires from a power cell disposed within said hollow opening of said cartridge may extend.

5. The system of claim 4, further comprising a retaining member receiving feature defined in a radially inside surface of said generally cylindrical body to removably receive a retaining member.

6. The system of claim 5, wherein said retaining member receiving feature comprises a circumferential groove formed in said inside surface of said body.

7. The system of claim 6, further comprising:
   a removable biasing member disposed within said circumferential groove in said body to thereby removably secure said cap structure to said cartridge, and said cartridge within said hollow region within said seat post.

8. The system of claim 4, further comprising an opening at a distal end of said seat post through which a connector to a power cell cartridge disposed within said seat post may extend.

9. The system of claim 8, further comprising:
   an external connector, affixed within said opening at a distal end of said seat post; and
   an internal connector, disposed within said axial hollow region in said seat post and in electrical communication with said external connector to which a power cell disposed within said power cell cartridge may connect in order to recharge said power cell.

10. The system of claim 9, further comprising a control circuitry module disposed in said axial hollow region in said seat post and in electrical communication with said external connector and said internal connector, for providing control of operation of electronic and/or electromechanical mechanisms communicatively connected thereto.

11. A seat post for removably securing a power cell cartridge therein, comprising:
   a generally cylindrical body defining an axial hollow region initiating at a proximal end thereof, said body having defined in a radially inside surface defining said axial hollow region a first shoulder to form a stop for a power cell cartridge that may be inserted within said cylindrical body, said body further having defined therein a radially inside surface between said first shoulder and said proximal end thereof a second shoulder to stop insertion of a retaining cap into said body, said body further having defined therein a retaining member receiving feature in a radially inside surface between said second shoulder and said proximal end to removably receive a retaining member for retaining said retaining cap against said body.

12. The system of claim 11, wherein said retaining member receiving feature comprises a circumferential groove formed in said inside surface of said body.

* * * * *